US008914778B2

(12) United States Patent
Chen et al.

(10) Patent No.: US 8,914,778 B2
(45) Date of Patent: Dec. 16, 2014

(54) DATA PLACEMENT FOR EXECUTION OF AN EXECUTABLE (71) Applicant: International Business Machines Corporation, Armonk, NY (US)

(72) Inventors: Tong Chen, Yorktown Heights, NY (US); John K. O'Brien, South Salem, NY (US); Zehra Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 13/668,712

(22) Filed: Nov. 5, 2012

(65) Prior Publication Data

US 2014/0129787 A1    May 8, 2014

(51) Int. Cl.
G06F 9/45    (2006.01)

(52) U.S. Cl.
CPC ........................................ G06F 8/41 (2013.01)
USPC .......................................................... 717/140

(58) Field of Classification Search
CPC ............... G06F 7/78; G06F 8/00–8/78; G06F 9/44–9/455; G06F 11/36
USPC ................................................. 717/100–178
See application file for complete search history.

(56) References Cited

U.S. PATENT DOCUMENTS

| 5,764,989 | A | 6/1998 | Gustafsson et al. |
| 5,983,019 | A | 11/1999 | Davidson |
| 6,077,315 | A | 6/2000 | Greenbaum et al. |
| 6,367,068 | B1 | 4/2002 | Vaidyanathan et al. |
| 6,427,162 | B1 * | 7/2002 | Mohamed ...................... 718/108 |
| 6,606,742 | B1 | 8/2003 | Orton et al. |
| 6,820,255 | B2 | 11/2004 | Babaian et al. |
| 7,024,656 | B1 * | 4/2006 | Ahad ............................. 717/116 |
| 7,120,639 | B1 * | 10/2006 | de Jong et al. ................ 707/694 |
| 7,340,728 | B2 | 3/2008 | Kutter |
| 7,383,542 | B2 | 6/2008 | Richardson et al. |
| 7,685,577 | B2 | 3/2010 | Pace et al. |
| 8,079,023 | B2 | 12/2011 | Chen |
| 8,108,844 | B2 | 1/2012 | Crutchfield et al. |
| 8,146,064 | B2 | 3/2012 | Chen et al. |

(Continued)

OTHER PUBLICATIONS

Kyriazis, Heterogeneous System Architecture: A Technical Review, 2012.*

(Continued)

Primary Examiner — Wei Zhen
Assistant Examiner — Zhan Chen
(74) Attorney, Agent, or Firm — Cantor Colburn LLP; William Stock (57) ABSTRACT According to one embodiment, a method for a compiler to produce an executable module to be executed by a computer system including a main processor and active memory devices includes dividing source code into code sections, identifying a first code section to be executed by the active memory devices, wherein the first code section is one of the code sections and identifying data structures that are used by the first code section. The method also includes classifying the data structures based on pre-defined attributes, formulating, by the compiler, a storage mapping plan for the data structures based on the classifying and generating, by the compiler, mapping code that implements the storage mapping plan, wherein the mapping code is part of the executable module and wherein the mapping code maps storing of the data structures to storage locations in the active memory devices.

18 Claims, 4 Drawing Sheets

(56) References Cited

U.S. PATENT DOCUMENTS

| | | |
|---|---|---|
| 8,239,843 B2 | 8/2012 | Song et al. |
| 8,276,131 B2 | 9/2012 | Langman et al. |
| 8,332,828 B2 | 12/2012 | Vargas |
| 8,370,819 B2 | 2/2013 | Chakraborty et al. |
| 8,510,723 B2 | 8/2013 | Barua et al. |
| 8,522,222 B2 | 8/2013 | Tillmann |
| 8,584,106 B2 | 11/2013 | Papakipos et al. |
| 2004/0143815 A1* | 7/2004 | Cherdron et al. ............ 717/105 |
| 2005/0055676 A1* | 3/2005 | Bohlmann et al. ........... 717/136 |
| 2006/0288334 A1* | 12/2006 | Tian et al. .................... 717/127 |
| 2007/0006223 A1* | 1/2007 | Wetherly et al. ............. 717/178 |
| 2007/0094648 A1* | 4/2007 | Post .............................. 717/140 |
| 2007/0299863 A1* | 12/2007 | Fu et al. ........................ 707/102 |
| 2008/0046869 A1* | 2/2008 | Lambert et al. .............. 717/136 |
| 2008/0098265 A1* | 4/2008 | Dmitrovich et al. ......... 714/710 |
| 2008/0109803 A1* | 5/2008 | Fisher et al. ................. 717/175 |
| 2009/0119650 A1* | 5/2009 | Bhandari et al. ............. 717/133 |
| 2009/0158019 A1* | 6/2009 | O'Brien et al. .............. 712/245 |
| 2009/0249315 A1* | 10/2009 | Schreter ....................... 717/140 |
| 2010/0042585 A1* | 2/2010 | Adler ............................... 707/3 |
| 2011/0131548 A1* | 6/2011 | Colton et al. ................. 717/106 |
| 2011/0167406 A1* | 7/2011 | Charisius et al. ............ 717/108 |

OTHER PUBLICATIONS

Managing Code in the Database, Chapter 23 of Oracle PL/SQL Programming, Second Edition.*

Danalis et al., THe Scalable HeterOgeneous Computer (SHOC) Benchmark Suit, 2010.*

D. Dharjati, et al., "Memory Safety Without Garbage Collection of Embedded Applications," ACM Transactions on Embedded Computing Systems, vol. 4, No. 1; 2005; pp. 73-111.

M. Hicks, et al., "Experience With Safe Manual Memory Management in Cyclone," ACM, pp. 73-84, 2004.

R. Rugina, et al., "Symbolic Bounds Analysis of Pointers, Array Indices, and Accessed Memory Regions," ACM Transactions on Programming Languages and Systems, vol. 27, No. 2, pp. 185-235; 2005.

* cited by examiner

DATA PLACEMENT FOR EXECUTION OF AN EXECUTABLE

BACKGROUND

The present invention relates to computer system management, and more specifically, to using a compiler to organize data placement for execution of executables in computer systems that include active memory devices.

Computer systems often require a considerable amount of high speed memory, such as random access memory (RAM), to hold information, such as data and programs, when a computer is powered and operational. Memory device densities have continued to grow as computer systems have increased performance and complexity.

In operation, a compiler in memory receives a program and compiles it to produce an executable. The executable is loaded into a virtual address and is accessed by an operating system (OS) at runtime. The OS may load instructions into the physical memory prior to execution of certain portions of code. In some cases, instructions that are loaded into physical memory cannot be dynamically adjusted during runtime, thus resulting in reduced performance. The instructions may be loaded as pages in physical memory. If a page is loaded in a memory at a first location and a processor is located in a separate second location, the page may not be efficiently accessed by the processor. In addition, in cases with a limited amount of memory, a limited amount of data is loaded into physical memory, leading to reduced performance.

SUMMARY

According to one embodiment, a method for a compiler to produce an executable module to be executed by a computer system including a main processor and active memory devices includes dividing source code into code sections, identifying a first code section to be executed by the active memory devices, wherein the first code section is one of the code sections and identifying data structures that are used by the first code section. The method also includes classifying the data structures based on pre-defined attributes, formulating, by the compiler, a storage mapping plan for the data structures based on the classifying and generating, by the compiler, mapping code that implements the storage mapping plan, wherein the mapping code is part of the executable module and wherein the mapping code maps storing of the data structures to storage locations in the active memory devices.

According to another embodiment, a method is provided for distributing data in memory for execution of an executable module by a computer system, where the computer system includes a main processor and active memory devices. The method includes receiving an executable generated by a compiler, wherein the executable includes mapping code that implements mapping of data structures used by the executable to physical memory. The method also includes determining storage locations in the active memory devices for the data structures based on the mapping code and the main processor executing the mapping code to call a function in an operating system that maps the data structures to the storage locations in the active memory, wherein the mapping code organizes mapping of the data structures based on pre-defined attributes.

DETAILED DESCRIPTION

An embodiment is directed to a computer system with a main processor and one or more active memory devices. In particular, a compiler provides an executable for execution on the main processor and active memory devices, where the executable provides mapping of data structures that are utilized by code executing on the active memory devices. In an embodiment, the compiler optimizes and organizes data distribution in the computer system to improve efficiency during execution of the executable on the computer system. Embodiments of the compiler divide source code into code sections and identify a first code section to be performed by the active memory devices. The compiler also identifies data structures that are used by the first code section and then classifies the data structures based on pre-defined attributes, where the attributes are useful in improving executable efficiency. The compiler then formulates a storage mapping plan for the data structures based on the attribute-based classification. The compiler generates mapping code that implements the storage mapping plan during execution of the executable. In embodiments, the processing elements can only access the memory vaults within the active memory device containing the processing elements. Accordingly, embodiments provide data mapping to allow execution of an executable in active memory devices.

In an embodiment, the pre-defined attributes used for classifying can help determine a location for the data and may include: the data structures being read and write data, the data structures being read only, number of accesses to the data structures, type of accesses to the data structures, size of the data structures and allocation time for the data structures. In an embodiment, allocation time for the data structures is the time at which the data is needed in the computer system, such as during load time, when a subroutine is loaded or when specifically called by a program. In one embodiment, the mapping code is executed during runtime by making calls to routines for an operating system, where the calls map virtual addresses to physical address pages for the data structures.

In an embodiment, the active memory device includes a processing element in a memory device, as discussed below. In embodiments, the processing element is capable of performing a variety of tasks, such as arithmetic operations, loads, stores and decrements. In one embodiment, the processing element receives a command from the main processor, where the command includes a series of instructions performed by the processing element. In one embodiment, the processing element is part of a memory system including an active memory device, such as an active buffered memory device. The memory device may be any suitable memory device including one or more memory device (e.g., random access memory "RAM" chips) connected to a memory controller chip configured to control the memory device. In an embodiment, the active memory device includes layers of memory that form a three dimensional ("3D") memory device where individual columns of memory chips form stacks or vaults in communication with the controller chip. In one embodiment, a plurality of memory stacks are located on an active memory device, where each stack has a respective memory controller. The stacks may also include a processing element configured to communicate with the memory and other processing elements in the active memory device. In other embodiments, processing elements are physically separated from the memory stacks but are still part of the active memory device, where the processing elements are pooled and available to perform instructions using any of the memory stacks within the device. The processing element can receive commands or instructions from a main processor and perform operations based on the received commands. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller or memory controller.

Embodiments include a memory stack with a processing element and memory controller, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In one embodiment, the active memory device is configured to load configuration information or instructions from a part of the active memory device into a processing element following receiving a command from an external requestor in the computing system, such as a main processor or another processing element. In addition, the processing element may perform virtual-to-real address translations that it computes while executing the loaded instructions.

In embodiments, it is desirable to have processing capabilities within the active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

Figure 1:
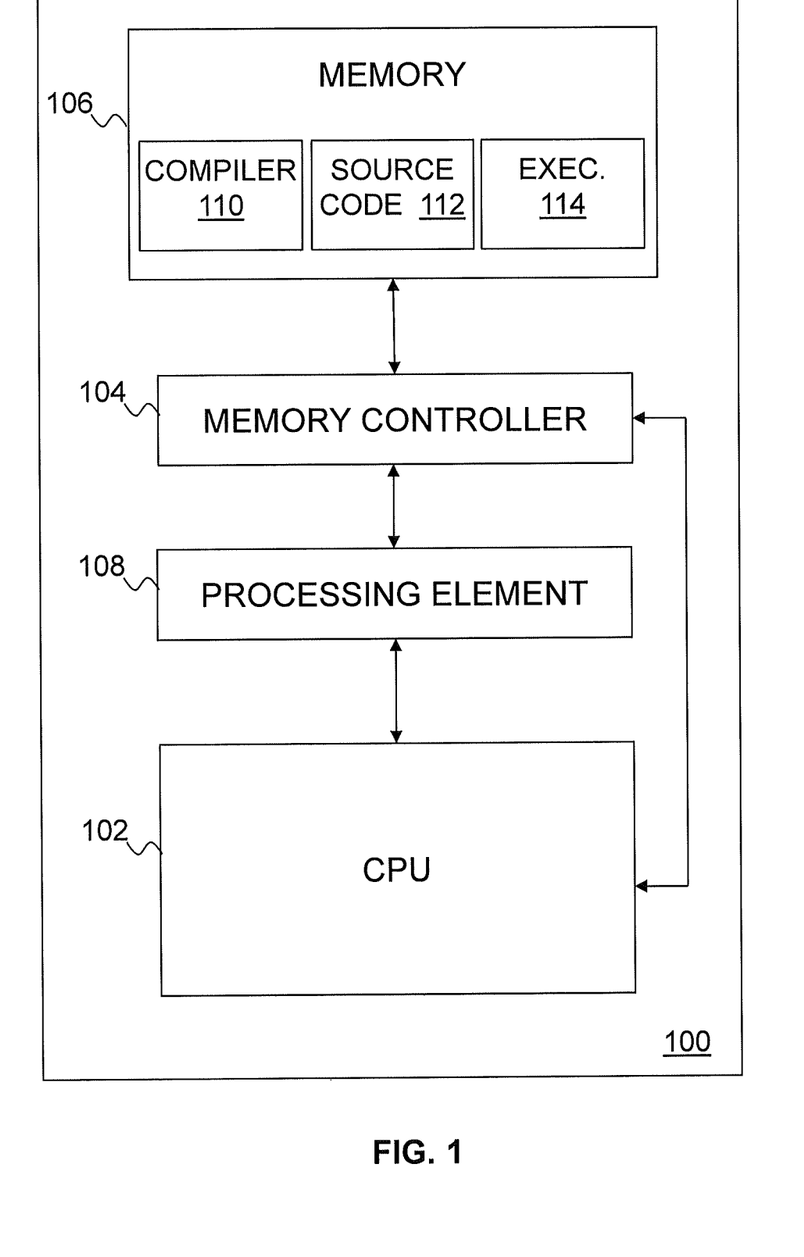
FIG. 1 illustrates a block diagram of a computer system in accordance with an embodiment.

FIG. 1 illustrates a block diagram of a computer system for execution of applications in accordance with an embodiment. A computer system 100 depicted in FIG. 1 includes a computer processor 102, a memory 106 having memory devices, as well as a memory controller 104 and processing element 108.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 102 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the main processor or computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory. In an embodiment, the processing element 108 receives a task as part of the command, where a part of the task may be sent back to the computer processor 102 for execution. The computer processor 102 may be better suited to execute functions specified by the task due to several factors, such as data location and support for the functions. In an embodiment, the memory 106, memory controller 104 and processing element 108 are combined into a single device, such as an active memory device, in communication with the main processor 102.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

The memory 106 may store one or more separate programs, each of which comprises an ordered listing of executable instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing the features, processes, methods, functions, and operations of the exemplary embodiments, as will be described further herein. Optimized code is executed in a runtime environment (not shown) of the system 100.

The applications may include a source code 112, executable program (object code), script, or any other entity comprising a set of instructions to be performed. When the application is source code 112, the program code is translated via the compiler 110 to the executable 114.

Figure 2:
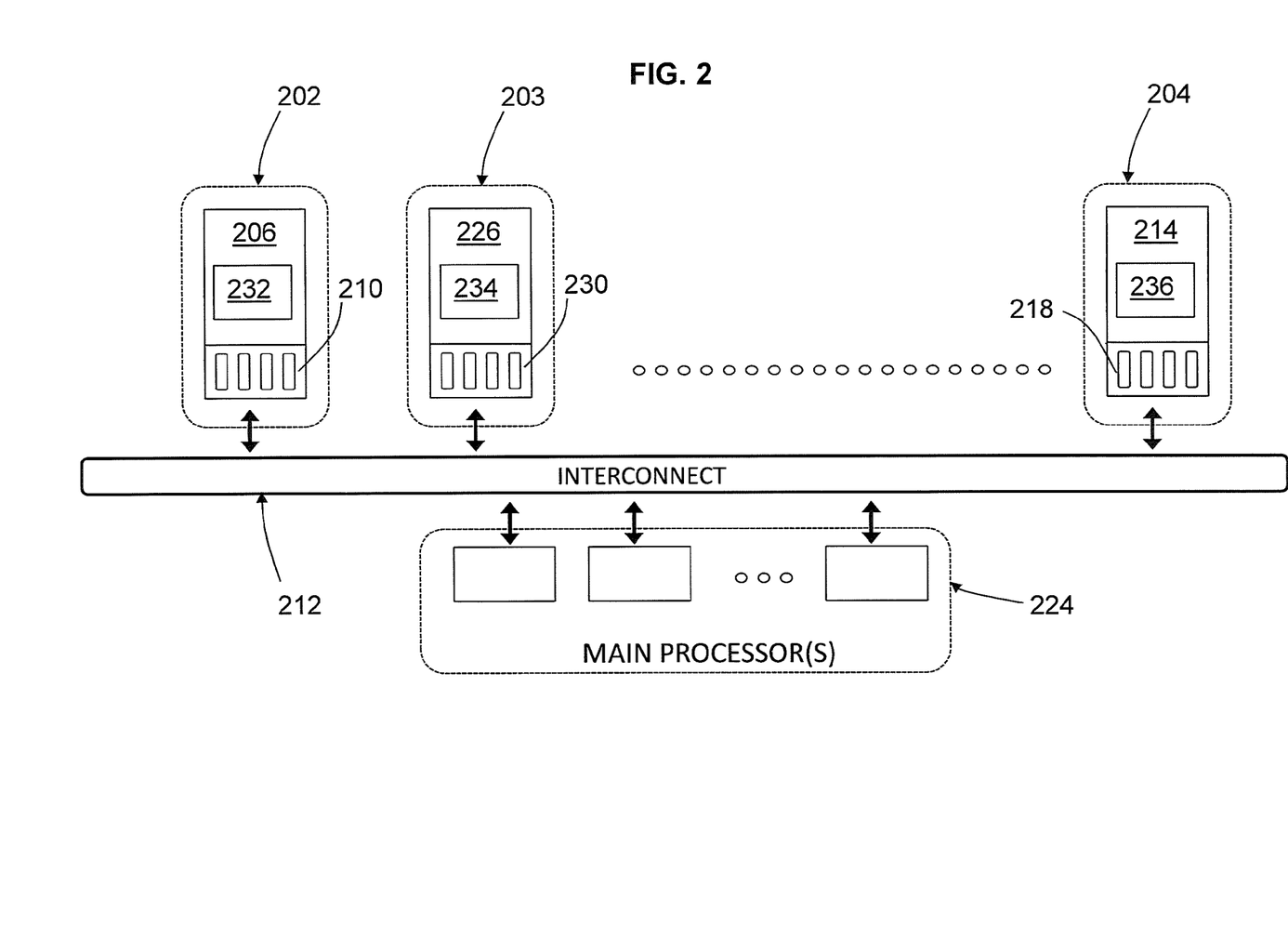
FIG. 2 illustrates a block diagram of a computer system with a main processor, memory and processing elements in accordance with an embodiment.

FIG. 2 is a schematic diagram of an embodiment of a computer system 200 implementing dynamic memory page management. In one embodiment, the computer system 200 includes an active memory device 202, an active memory device 203 and an active memory device 204. The active memory device 202 includes a memory vault 206 and a processing element 210. In an embodiment, the processing element 310 in the active memory device 202 is coupled to and communicates with the active memory devices 203 and 204 via an interconnect network 212. The interconnect network 212 is also coupled to one or more main processors 224, thus enabling communication between the main processors 224 and active memory devices 202, 203, 204. The interconnect network 212 provides a fast and high bandwidth path for communication between portions of the device, such as processing elements, memory controllers and memory, to provide improved performance and reduced latency for the computer system 200 using active memory.

The active memory device 203 includes a memory vault 226 and a processing element 230. Similarly, the active memory device 204 includes a memory vault 214 and a processing element 218. In an embodiment, the processing elements 210, 230, 218 and memory vaults 206, 226, 214 are located within a single stack. By positioning the processing element in the same memory device as the memory vault, latency is reduced when accessing locations in the memory vault, thus further improving performance. Embodiments of the active memory devices may each include a plurality of stacks, where each stack includes a memory vault and a processor. For example, the active memory devices 202, 203 and 204 may include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another. In one embodiment with processing elements located in each active memory device, the processing element may efficiently access instructions memory within the device, where access to memory in other devices involves accessing the operating system and therefore less efficient. In an embodiment, a processing element located in the active memory device 202 is not able to efficiently access data structures located in memory of the active memory device 203, such as data structure 234. Thus, data structures 232, 234 and 236 are placed in respective memory 206, 226 and 214, to provide efficient access to the data structures by each active memory device. Accordingly, a processing element located in a first active memory device is not able to efficiently execute code that accesses data structures located in memory of a second active memory device. Embodiments described herein provide improved executables from compilers that organize and formulate a storage mapping plan based on classifying data structures based on pre-defined attributes. The mapping plan is then used to provide mapping code in the executable that controls the location and/or time for data structure placement during execution of an executable.

In embodiments, the processing elements, memory vaults and memory controllers may be arranged in a suitable manner depending on the application. For example, one or more processing elements may be positioned on one side of the interconnect network 212 and may operate as a pool of processing elements that are available for accessing any memory (e.g., memory vault) in the memory system coupled to the interconnect network 212. The pooled processing elements are not limited to accessing a particular memory vault and, thus, one or more elements may be utilized upon receiving a command from the main processor 224. In embodiments, the processing elements can only access the memory vaults within the active memory device containing the processing elements. Accordingly, embodiments provide data mapping to memory in the device to allow execution of portions of an executable in active memory device that may not have copies of the necessary data prior to the compiler creation of the executable.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by external requestors, like the main processor, coupled to the interconnect network.

The process for generating by a compiler and executing executable code may be implemented using the systems and components described in FIGS. 1-2. The system has at least two distinct processor types, the main processors 224 and the processing elements 210, 230, 218. The different processor types have different characteristics that impact the performance of code that executes on them, e.g. the processing elements have higher memory bandwidth, lower latency to main memory, higher degree of multi-processing, richer set of vector instructions, and more power efficient computation compared to the main processors. On the other hand, the main processors have access to privileged operations through the operating system, support a stack and traditional calling conventions that allow for generic and recursive function calls, have data and instruction caches, and implement speculative out-of-order execution to enable faster execution times. As a result, certain code sections will exhibit better power-performance characteristics on the main processors (e.g. code with lots of memory re-use, or branches and calls), while certain other code sections will exhibit better power-performance characteristics on the processing elements (e.g. code that performs random accesses on large datasets, or streaming computation). To maximize utilization of the whole system and achieve the fastest execution, work must be judiciously divided between the different processor types. The compiler process described in FIG. 3 can optimize the distribution of work across the main processors and processing elements such that all processors in the system are optimally utilized.

Further, the system and components described in FIGS. 1-2 provide opportunities for optimization, e.g., execution time can be improved by exploiting the many more levels of parallelism available in the system (different types of processors, multiple processors of each type, slices within processing elements, vector processing, and multi-threading). However, the system may also have new constraints, e.g. the factors such as power budget may not allow all processors in the system to be simultaneously active. Both these features directly impact the process of optimally distributing work, requiring improved analysis in the compiler process described in FIG. 3. For instance, a code section may be scheduled for execution on a processing element even though it has better power-performance characteristics on a main processor, because the power constraints do not allow the main processor to be active at that point in the execution. Accordingly, the data structures accessed by the code are mapped based on the work distribution. Parameters associated with the power budget may be configured via the compiler and used to assess whether a code section should be executed on a main processor or a processing element. For example, a parameter of 'z' may evaluate whether, upon execution of a code section, a main processor may be active due to power constraints determined as a current state of the system. A value of True, or Yes, results in execution of the code section on the main processor, while a value of False, or No, results in execution of the code section on a processing element.

Figure 3:
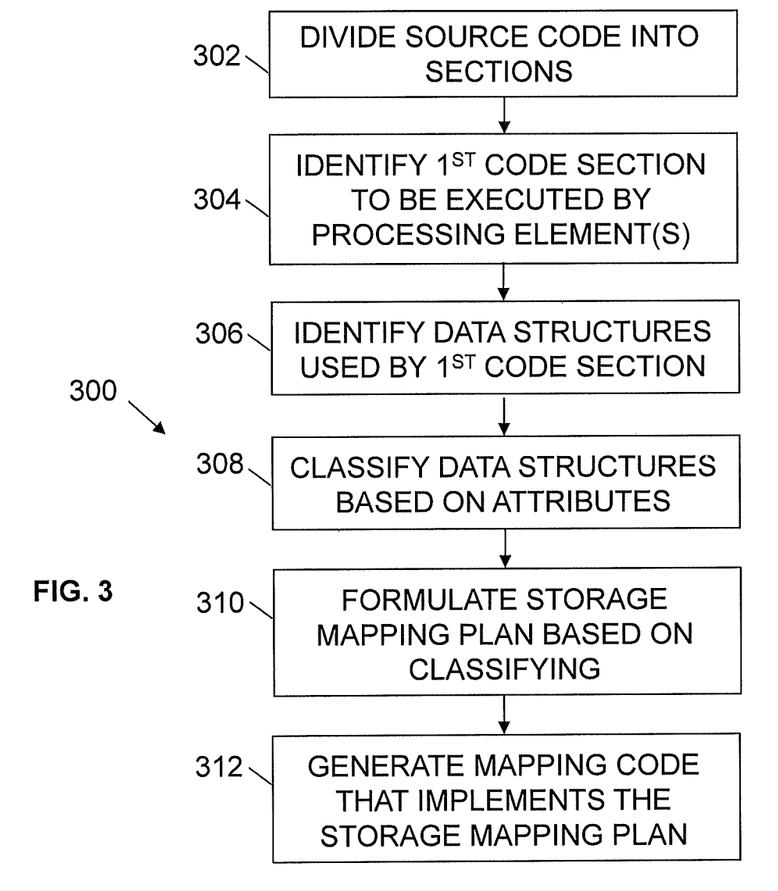
FIG. 3 illustrates a flow diagram of a method for providing an executable to be executed by a computer system in accordance with an embodiment.

FIG. 3 is a flow chart 300 of an exemplary process for providing an executable to be executed on a computer system, such as the systems in FIGS. 1 and 2. In an embodiment, the blocks in the flow chart 300 are performed by a compiler operating in memory of a computer system. The executable created by the compiler may be executed in a system with a main processor and active memory devices. In one embodiment, the computer system hosting the compiler may be different than the computer system that receives and performs the executable. In another embodiment, the compiler is on the same computer system that performs the executable. In block 302, the compiler divides source code into code sections. In block 304, a first code section is identified as code to be executed by processing elements in the active memory devices. In block 306, the compiler identifies the data structures that used by the first code section during execution in the active memory devices. In block 308, the data structures identified in block 306 are classified based on pre-defined attributes.

In one embodiment, the pre-defined attributes include: the data structures being read and write data, the data structures being read only, number of accesses to the data structures, type of accesses to the data structures, size of the data structures and allocation time for the data structures. For example, for data structures that are classified as read only, copies of the data structures may be written to each active memory device using the data structures. This is because the data cannot be changed and thus the multiple copies may be used during execution without risk of reading corrupted or incorrect data at a location. In addition, data structures classified as read and write data may be scheduled to be written and read from active memory devices based on when the data is used by each active memory device, where the scheduling ensures that the data is not corrupted when read, written or copied in the active memory devices. For example, a data structure classified as read and write data may be written to a first active memory device at a first time where code in the first active memory device performs instruction(s) using the data. The data structure may be altered during execution of the instruction(s). When the first active memory device completes the instruction(s), the data structure is read from the first active memory device by the main processor, where the data structure is then, at a second time, written to a second active memory device that performs another set of instructions on the data. In addition, the attribute describing the allocation time for the data is a time at which the data is loaded and allocated into physical memory. Examples of allocation times include, but are not limited to, data statically allocated at a program load time, a procedure entry time for a called subroutine that is executed the active memory device and a time specified in the an explicit call in the source code to allocate memory for mapping a selected data structure to a selected active memory device.

With continued reference to FIG. 3, block 310 includes the compiler formulating a storage mapping plan based on the classifying described in block 308. In block 312, the compiler then generates mapping code that implements the storage mapping plan where the mapping code is part of the executable that is created based on the source code. In an embodiment, the mapping code is executed during runtime by making calls to an operating system that map virtual addresses to physical addresses (e.g., addresses in active memory devices) for the data structures based on the storage mapping plan. In one embodiment, the mapping code maps a first data structure to a first active memory device at a first time during runtime and also maps a second data structure to a second active memory device at a second time during runtime, where the second time is after the first time.

Figure 4:
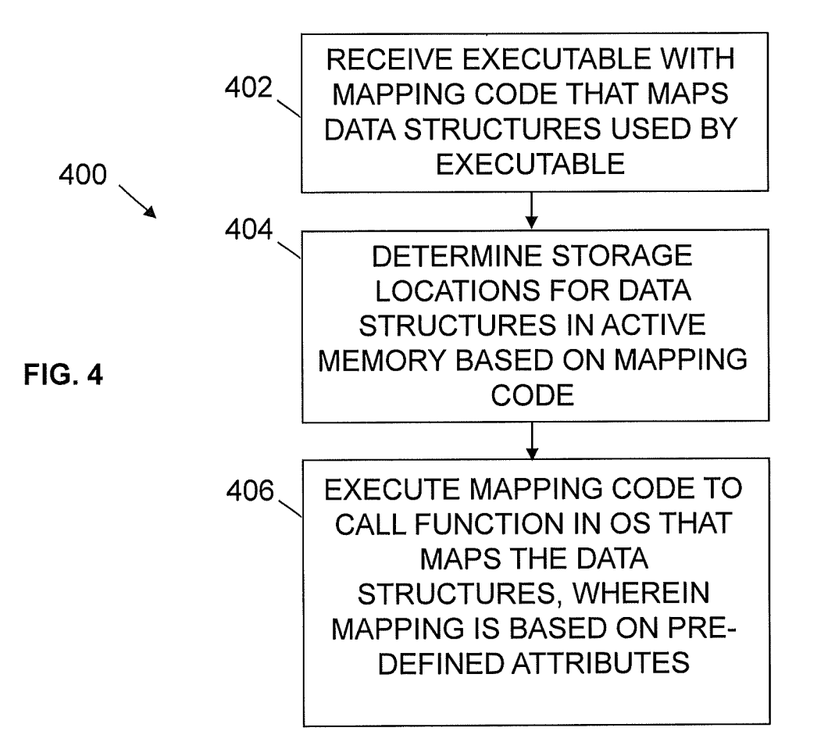
FIG. 4 illustrates a flow diagram of executing an executable in a computer system in accordance with an embodiment.

FIG. 4 is a flow chart 400 of an exemplary process for executing an executable on a computer system, such as the systems in FIGS. 1 and 2. In an embodiment, the blocks in the flow chart 400 are performed by hardware in the computer system (e.g., main processor, processing element, memory)

running the executable and compiler-generated code in the executable. In block 402, a compiler-generated executable is received that includes mapping code that maps data structures to physical memory, where the data structures are used by the executable. In block 404, storage locations in the active memory devices for the data structures are determined based on the mapping code. In block 406, the mapping code is executed, thus calling a function in an operating system of the computer system, where the function maps the data structures. The mapping code organizes mapping or storing of the data structures based on pre-defined attributes, such as those discussed above with reference to FIG. 3.

In an embodiment, the mapping code is executed during runtime by making calls to the operating system that map virtual addresses to physical addresses for the data structures. In one embodiment, during execution, a first data structure is mapped to a first active memory device at a first time and a second data structure is mapped to a second active memory device at a second time, where the second time is after the first time. In embodiments, the allocation time used as an attribute to classify the data structures includes, but is not limited to: statically allocated data at program load time, a procedure entry time for a called subroutine executed by an active memory device and a time specified by an explicit call to allocate memory for mapping a data structure to a active memory device. In one embodiment, these allocation times in the mapping code may be static allocations that determine the location and/or time for storing the data prior to execution of the executable. In an embodiment, the mapping code may dynamically store, copy or move data, such as by determining a location and/or time for storing of the data structures during runtime. In one example, if there are selected global variables that are determined, by compiler analysis, to be used by the processing elements in one active memory device, these variables can be gathered in a data structure and are mapped to that active memory device when the program is loaded. In another example, if some automatic variables belonging to a procedure are determined, by compiler analysis, to be used by the processing elements in one active memory device, these variables can be gathered in a data structure and are mapped to that active memory device dynamically when the procedure is called at runtime.

Technical benefits include improved efficiency and performance of code by computer systems by organizing data structure placement in memory during execution of an executable by computer systems that include active memory devices. A compiler formulates a mapping plan used to provide mapping code in the executable that maps data structure placement in selected memory locations during execution, thus enabling efficient execution of the executable at several memory and processing locations in the computer system. Embodiments provide mapping of data structure placement by address or location and time, based on pre-defined attributes of the data structures and the code in the executable, thus optimizing performance of the executable. Other systems with active memory devices that do not map data structures may be prevented from executing portions of an executable on an active memory device that does not have a needed data structure stored therein.

A method and system for distributing data in memory for execution of an executable by a computer system including a main processor and active memory devices is provided, where the method and the system is configured to perform the method comprising: receiving an executable generated by a compiler, wherein the executable comprises mapping code that implements mapping of data structures used by the executable to physical memory; determining storage locations in the active memory devices for the data structures based on the mapping code; and executing the mapping code, by the main processor, to call a function in an operating system that maps the data structures, wherein the mapping code organizes mapping of the data structures based on pre-defined attributes.

In an embodiment, the method also includes wherein the pre-defined attributes comprise at least one selected from the group consisting of: the data structures being read and write data, the data structures being read only, number of accesses to the data structures, type of accesses to the data structures, size of the data structures and allocation time for the data structures.

In an embodiment, the method also includes wherein executing the mapping code comprises executing the mapping code during runtime by making calls to the operating system that map virtual addresses to physical addresses for the data structures.

In an embodiment, the method also includes wherein executing the mapping code comprises executing the mapping code that maps a first data structure to a corresponding first active memory device at a first time during runtime, the data structures including the first data structure and the active memory devices including the first active memory device. In an embodiment, the method also includes wherein executing the mapping code comprises executing the mapping code that maps a second data structure to a second active memory device at a second time during runtime, the second time being after the first time, the data structures including the second data structure and the active memory devices including the second active memory device. In an embodiment, the method also includes wherein the first time comprises a program load time and the first data structure comprises statically allocated data or a procedure entry time for a called subroutine executable by the first active memory device.

In an embodiment, the method also includes wherein executing the mapping code comprises executing the mapping code that stores the data structures in physical memory of active memory devices that utilize the data structures during execution of the executable.

In an embodiment, the method also includes wherein receiving the executable comprises receiving an executable based on source code that includes an explicit call to allocate memory for mapping a selected data structure to a selected active memory device at a selected time. In an embodiment, the method also includes wherein executing the mapping code comprises allocating memory space or creating copies of the data structures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for a compiler to produce an executable module to be executed by a computer system including a main processor and active memory devices, the method comprising:
    dividing source code into code sections;
    identifying a first code section to be executed by the active memory devices, wherein the first code section is one of the code sections;
    identifying data structures that are used by the first code section;
    classifying the data structures based on pre-defined attributes;
    formulating, by the compiler, a storage mapping plan for the data structures based on the classifying, the storage mapping plan for the data structures being related to a first active memory device and a second active memory device; and
    generating, by the compiler, mapping code that implements the storage mapping plan, wherein the mapping code is part of the executable module and wherein the mapping code maps storing of the data structures to storage locations in the active memory devices;
    wherein generating, by the compiler, mapping code that implements the storage mapping plan comprises generating mapping code that maps a first data structure to a first active memory device at a first time during runtime, the data structures including the first data structure and the active memory devices including the first active memory device;
    wherein the first active memory device is hardware comprising a first memory vault and a first processing element;
    wherein the second active memory device is hardware comprising a second memory vault and a second processing element.

2. The method of claim 1, wherein classifying the data structures based on pre-defined attributes comprises classifying the data structures based on the data structures being read and write data, the data structures being read only, number of accesses to the data structures, type of accesses to the data structures, size of the data structures, and allocation time for the data structures.

3. The method of claim 2, wherein allocation time for the data structures comprises a time at which the data structures are loaded for use by the executable.

4. The method of claim 1, wherein generating, by the compiler, mapping code that implements the storage mapping plan comprises generating mapping code that is executed during runtime by making calls to an operating system that map virtual addresses to physical addresses for the data structures.

5. The method of claim 1, wherein generating, by the compiler, mapping code that implements the storage mapping plan comprises generating mapping code that maps a second data structure to the second active memory device at a second time during runtime, the second time being after the first time, the data structures including the second data structure and the active memory devices including the second active memory device.

6. The method of claim 1, wherein the first time comprises a program load time and the first data structure comprises statically allocated data.

7. The method of claim 1, wherein the first time comprises a procedure entry time for a called subroutine executable by the first active memory device.

8. The method of claim 1, wherein the source code includes an explicit call to allocate memory for mapping a selected data structure to a selected active memory device at a selected time.

9. The method of claim 1, wherein generating, by the compiler, mapping code that implements the storage mapping plan comprises generating mapping code that stores the data structures in physical memory of active memory devices that utilize the data structures during execution of the executable.

10. The method of claim 1, wherein generating, by the compiler, mapping code that implements the storage mapping plan comprises allocating memory space or creating copies of the data structures.

11. A method for distributing data in memory for execution of an executable module by a computer system including a main processor and active memory devices, the method comprising:
    receiving an executable generated by a compiler, wherein the executable comprises mapping code that implements mapping of data structures used by the executable to physical memory;
    determining storage locations in the active memory devices for the data structures based on the mapping code, the mapping code for the data structures being related to a first active memory device and a second active memory device; and
    executing the mapping code, by the main processor, to call a function in an operating system that maps the data structures to the storage locations in the active memory, wherein the mapping code organizes mapping of the data structures based on pre-defined attributes;
    wherein executing the mapping code comprises executing the mapping code that maps a first data structure to a corresponding first active memory device at a first time during runtime, the data structures including the first data structure and the active memory devices including the first active memory device;
    wherein the first active memory device is hardware comprising a first memory vault and a first processing element;
    wherein the second active memory device is hardware comprising a second memory vault and a second processing element.

12. The method of claim 11, wherein the pre-defined attributes comprise the data structures being read and write data, the data structures being read only, number of accesses to the data structures, type of accesses to the data structures, size of the data structures and allocation time for the data structures.

13. The method of claim 11, wherein executing the mapping code comprises executing the mapping code during runtime by making calls to the operating system that map virtual addresses to physical addresses for the data structures.

14. The method of claim 11, wherein executing the mapping code comprises executing the mapping code that maps a second data structure to the second active memory device at a second time during runtime, the second time being after the first time, the data structures including the second data structure and the active memory devices including the second active memory device.

15. The method of claim 11, wherein the first time comprises a program load time and the first data structure comprises statically allocated data or a procedure entry time for a called subroutine executable by the first active memory device.

16. The method of claim 11, wherein executing the mapping code comprises executing the mapping code that stores the data structures in physical memory of active memory devices that utilize the data structures during execution of the executable.

17. The method of claim 11, wherein receiving the executable comprises receiving an executable based on source code that includes an explicit call to allocate memory for mapping a selected data structure to a selected active memory device at a selected time.

18. The method of claim 11, wherein executing the mapping code comprises allocating memory space or creating copies of the data structures.

\* \* \* \* \*